United States Patent
Wiest et al.

(10) Patent No.: US 6,931,944 B2
(45) Date of Patent: Aug. 23, 2005

(54) MEASURING HEAD FOR AN ULTRASONIC FLOWMETER

(75) Inventors: Achim Wiest, Weil am Rehin (DE); Andreas Berger, Therwil (DE)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 10/481,880

(22) PCT Filed: Jul. 11, 2002

(86) PCT No.: PCT/EP02/07725
§ 371 (c)(1),
(2), (4) Date: Sep. 29, 2004

(87) PCT Pub. No.: WO03/006932
PCT Pub. Date: Jan. 23, 2003

(65) Prior Publication Data
US 2005/0066745 A1 Mar. 31, 2005

(30) Foreign Application Priority Data
Jul. 13, 2001 (DE) .......................................... 101 33 395

(51) Int. Cl.$^7$ ................................................. G01F 1/66
(52) U.S. Cl. .................................................... 73/861.25
(58) Field of Search .......................... 73/861.25, 861.26, 73/861.27, 861.28, 861.29, 861.31

(56) References Cited

U.S. PATENT DOCUMENTS

| | | | | |
|---|---|---|---|---|
| 4,333,353 A | * | 6/1982 | Baumoel .................. | 73/861.25 |
| 4,417,480 A | * | 11/1983 | Zacharias, Jr. ........... | 73/861.18 |
| 5,176,140 A | | 1/1993 | Kami et al. | |
| 5,437,194 A | * | 8/1995 | Lynnworth ............... | 73/861.27 |
| 5,664,456 A | | 9/1997 | Eckert | |
| 5,814,736 A | * | 9/1998 | Loschberger et al. .... | 73/861.25 |
| 6,776,051 B2 | * | 8/2004 | Suzuki et al. ............ | 73/861.27 |

* cited by examiner

*Primary Examiner*—Harshad Patel
*Assistant Examiner*—Corey D. Mack
(74) *Attorney, Agent, or Firm*—Bacon & Thomas

(57) ABSTRACT

A measuring head for an ultrasonic flowmeter, in which an ultrasonic coupling element and a measuring head housing are cast together and form, along with casting material, a contact surface E. The surface E allows an effective transfer of heat to the measuring head. In order to compensate manufacturing tolerances, the distance a between the measuring head housing and the ultrasonic coupling element is at least 1 mm in the area of the contact surface E.

7 Claims, 2 Drawing Sheets

MEASURING HEAD FOR AN ULTRASONIC FLOWMETER

FIELD OF THE INVENTION

The invention relates to a coupling element for an ultrasonic flowmeter.

BACKGROUND OF THE INVENTION

Ultrasonic flowmeters are used often in process- and automation-technology. They permit in simple manner contactless determination of volume flow rate in a pipeline.

Known ultrasonic flowmeters operate on the basis of either the Doppler principle or the travel time difference principle.

In the travel time difference principle, the different travel times of ultrasonic pulses are evaluated relative to the flow direction of the liquid.

For this, ultrasonic pulses are transmitted both in the direction of flow and opposite thereto. From the travel time difference, one determines the flow velocity, and, with that, knowing the diameter of the pipe section, the volume flow rate.

In the Doppler principle, ultrasonic waves of a known frequency are coupled into the liquid, and the ultrasonic waves reflected from the liquid are evaluated. Using the frequency shift between the waves coupled in and the reflected waves leads likewise to the flow velocity of the liquid.

Reflections in the liquid occur, however, only when small air bubbles or impurities are present therein, so that this principle finds application primarily in the case of contaminated liquids.

The ultrasonic waves are produced and received in a measuring head. The particular measuring head is fixed on the wall of the pipe section of concern. Recently, clamp-on ultrasonic measurement systems have become available. In these systems, the measuring head is only pressed with a clamp on the pipe wall. Such systems are described e.g. in EP-B 686,255, and the U.S. Pat. Nos. 4,484,478 and 4,598,593.

The essential elements of a measuring head are the measuring head housing, a piezoelement with connection unit, and an ultrasonic coupling element made of plastic. The ultrasonic waves are produced in the piezoelement and guided to the pipe wall through the ultrasonic coupling element. From there, they are conducted into the liquid.

In a known measuring head, the ultrasonic coupling element extends somewhat beyond the measuring head housing, so that only the ultrasonic coupling element contacts the measurement pipe. Due to the low heat conductivity of the ultrasonic coupling element, only a small heat transfer from the pipe wall to the measuring head is possible. For this reason, temperature gradients can arise in the measuring head, gradients which negatively affect the measurement accuracy.

An additional disadvantage of known measuring heads is that measuring head housing and ultrasonic coupling element are adhesively bonded. This requires very small tolerances in the manufacture of the measuring head housing. Cast parts, which have greater tolerances, therefore require expensive finishing operations.

SUMMARY OF THE INVENTION

An object of the invention is to provide a measuring head for an ultrasonic flowmeter, which measuring head lacks the above-mentioned disadvantages, makes a rapid, homogeneous temperature distribution possible in the measuring head and permits manufacturing tolerances in the production of the measuring head housing, and which can be produced simply and with favorable costs.

This object is solved by a measuring head for an ultrasonic flowmeter having a partially open measuring head housing, in which an ultrasonic coupling element with piezoelement and connection unit is fixed, characterized in that the ultrasonic coupling element and measuring head housing are cast, or potted, together and form with the cast, or potting, material a contact plane, wherein the separation between measuring head housing and ultrasonic coupling element in the area of the contact surface amounts to at least 1 mm.

The essential idea of the invention resides in that the casting together enables compensating of the manufacturing tolerances of the measuring head housing and simultaneously with placement of the measuring head on the measurement pipe an effective thermal equilibrium is possible by way of the entire contact surface.

For simplicity, the contact surface is flat.

In a further development of the invention, for reasons of cost, the measuring head housing is not filled completely with cast material.

For reliable fixing of the coupling element in the measuring head housing by the cast material, anchoring elements (e.g. lugs or grooves} are provided on the measuring head housing.

In advantageous manner, the cast material has a thermal conductivity>1 W/mK, in order to enable a rapid thermal equilibrium.

BRIEF DESCRIPTION OF THE DRAWINGS

The invention will now be explained in greater detail on the basis of the drawings, which show as follows.

DESCRIPTION OF THE PREFERRED EMBODIMENTS

Figure 1:
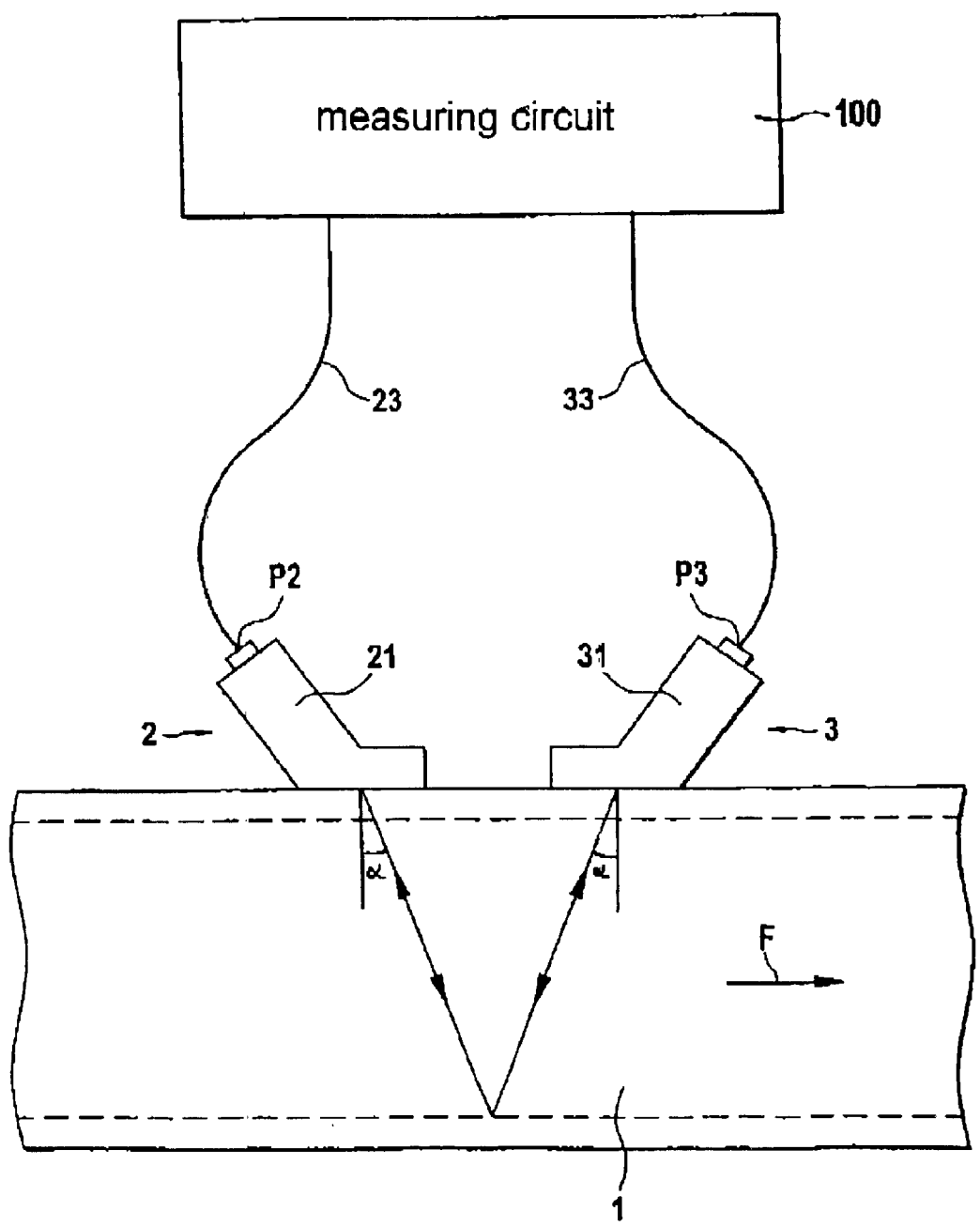
FIG. 1 A schematic drawing of an ultrasonic flowmeter having two measuring heads.

FIG. 1 shows, in greatly simplified manner, an ultrasonic flowmeter having two measuring heads 2, 3, which are arranged on the outer wall of pipe 1 and displaced from one another in a direction parallel to the axis. The liquid is flowing in the pipe 1 in the direction of arrow F.

The measuring head pair 2, 3 can be driven in two different ways. Either measuring head 2 acts as the transmitter and measuring head 3 as the receiver, or measuring head 3 is the transmitter and measuring head 2 the receiver, whereby measurements are taken alternating between in the flow directing and opposite to the flow direction.

The two measuring heads 2, 3 are connected over connection lines 23, 33, respectively, with a measuring circuit 100. The two connection lines 23, 33 carry the electrical pulses. Suitable measuring circuits 100 are known and are not the subject matter of the invention.

Figure 2:
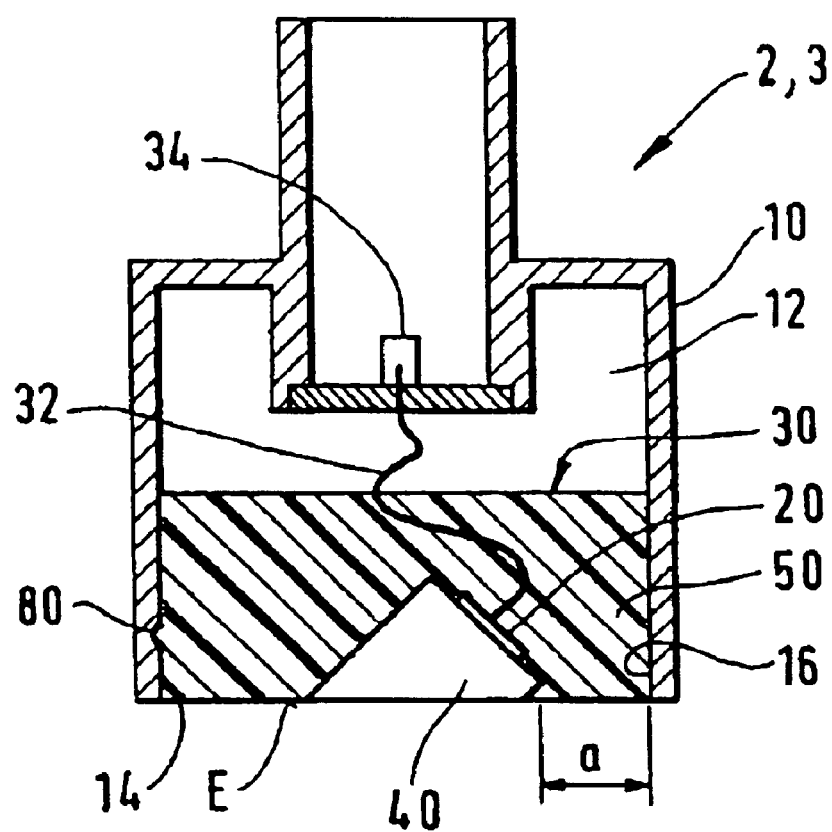
FIG. 2 a cross sectional drawing of a measuring head of FIG. 1.

FIG. 2 shows, approximately to scale, a measuring head of FIG. 1 in cross section. Essential elements of the measuring head 2, 3 are measuring head housing 10, piezoelement 20 with connection unit 30 and ultrasonic coupling element 40 made of plastic (e.g. PEEK, PI, PEI) as well as the cast material 50. The connection unit 30 is composed of a flexible cable-pair 32 and a plug connection 34 for the connection lines 23 or 33. The measuring head housing has an opening 14 to its interior 12, where the ultrasonic coupling element 40 is fixed.

Ultrasonic coupling element 40, measuring head housing 10 and casting material 50 form a contact surface E in the area of the opening 14.

In the region of the contact surface E, the distance a between ultrasonic coupling element 40 and the inner wall 16 of the measuring head housing 10 is at least 1 mm.

For supplemental fixing, anchoring elements 80 are provided on the measuring head housing 10. Shown is a groove; however, other means, such as lugs, etc. can be used.

The measuring head 2, 3 is suited for a temperature range from minus 20° to plus 80° Celsius.

Operation of the measuring head of the invention will now be described in more detail for an ultrasonic flowmeter.

In use, the measuring head 2, 3 lies with the entire contact surface E against the outer wall of the pipe 1. A temperature change in the liquid to be measured leads to a temperature change on the outer wall of the pipe 1. This temperature change is transferred to the measuring head 2, 3. Because the heat transfer from the pipe 1 occurs over the entire contact surface E, a rapid temperature equilibrium is possible. The heat transfer occurs not only from the pipe 1 to the ultrasonic coupling element 40, but also from the pipe 1 to the casting material 50 and to the measuring head housing 10. Through the good thermal conductivity of the casting mass 50 and the measuring head housing 10, which is normally made of metal, the temperature gradients are rapidly equaled out. This assures a reliable measuring.

Because the ultrasonic coupling element 40 and the measuring head housing 10 are cast together, the manufacturing tolerances in the manufacture of the measuring head housing 10 can be easily compensated. The contact surface E is primarily responsible for this compensation. It has been found that a separation a between measuring head housing 10 and ultrasonic coupling element 40 of 1 mm in the area of the contact plane E is sufficient for compensating expected manufacturing tolerances.

It makes sense for reasons of cost not to fill the entire interior 12 with casting material 50. Even a partial casting assures a reliable fixing of the ultrasonic coupling element 40.

During the casting, the casting material 50 enters into the groove 80 and, following solidification, prevents release of the ultrasonic coupling element 40 from the measuring head housing 10.

The high thermal conductivity of the casting material 50 contributes to an improved thermal equilibrium.

What is claimed is:

1. A measuring head for an ultrasonic flowmeter having:

an ultrasonic coupling element;

a piezoelement;

a connecting unit; and a partially open measuring head housing, in which said ultrasonic coupling element with said piezoelement and said connection unit are fixed, wherein:

said ultrasonic coupling element and said measuring head housing are cast together and form with cast material a contact surface E, and the separation a between said measuring head housing and said ultrasonic coupling element in the area of the contact surface E amounts to at least 1 mm.

2. The measuring head as claimed in claim 1, wherein:

said casting material has a thermal conductivity of at least 1 W/mK.

3. The measuring head as claimed in claim 1, wherein:

the contact surface E is flat.

4. The measuring head as claimed in claim 1, wherein:

said measuring head housing is not completely filled with casting material.

5. The measuring head as claimed in claim 1, further having:

anchoring elements provided on said measuring head housing.

6. The measuring head as claimed in claim 5, wherein:

a groove is provided as the anchoring element.

7. The measuring head as claimed in claim 5, wherein:

a lug is provided as the anchoring element.

* * * * *